Oct. 19, 1954  W. A. BROAD  2,691,892
BECKMANN THERMOMETER
Filed Aug. 4, 1950  2 Sheets-Sheet 1
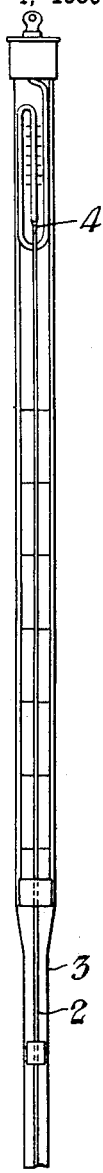
Fig.1.
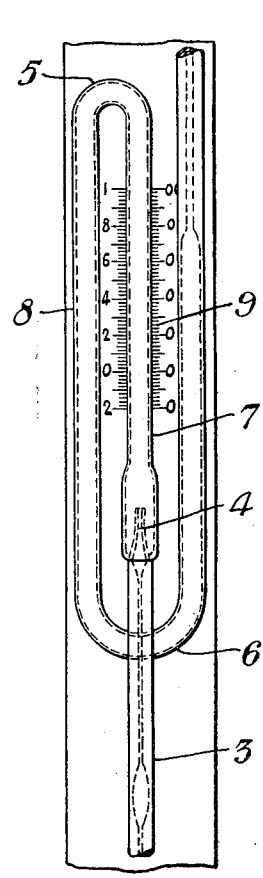
Fig.2
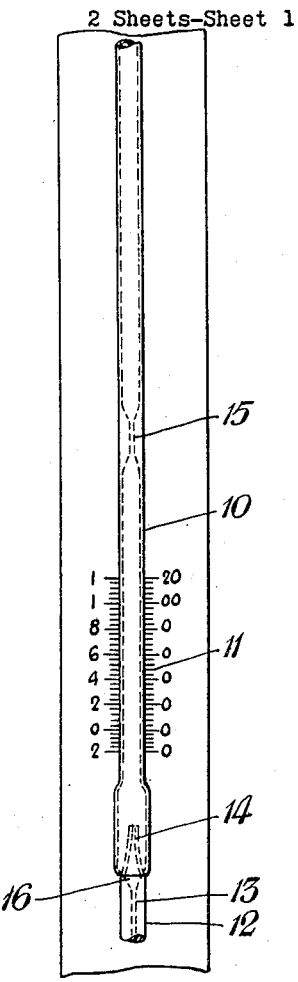
Fig.3.
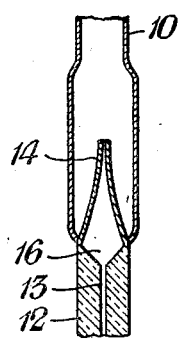
Fig.4.
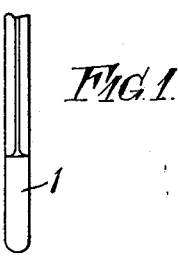
Inventor
Walter Alfred Broad
By:
Haseltine, Lake & Co.
Agents Oct. 19, 1954  W. A. BROAD  2,691,892
BECKMANN THERMOMETER
Filed Aug. 4, 1950  2 Sheets-Sheet 2

INVENTOR
WALTER ALFRED BROAD
By: Hazeltine, Lake & Co.
AGENTS

Patented Oct. 19, 1954

2,691,892

UNITED STATES PATENT OFFICE 2,691,892

BECKMANN THERMOMETER

Walter Alfred Broad, near Pontypridd, Wales, assignor to H. J. Elliott Limited, near Pontypridd, Wales, a British company Application August 4, 1950, Serial No. 177,605

Claims priority, application Great Britain August 16, 1949

8 Claims. (Cl. 73—371)

This invention relates to thermometers of the well-known Beckmann type, and it is an aim of the invention to simplify the construction of these thermometers whilst rendering them more simple to use.

Beckmann thermometers are already known in which there is a main reservoir for liquid (usually mercury) connected with the bore on a tube associated with the main scale, such tube having at its upper end a droplet splint. The droplet splint enters an auxiliary or spare reservoir intended for the reception of excess liquid. The spare reservoir essentially consists of a relatively large bore tube bent with two consecutive U-formations.

The known thermometer is employed in the manner usual with Beckmann thermometers and reliance is placed upon the fact that the liquid will run in either direction through the droplet splint but can be trapped in the convolutions of the auxiliary reservoir. The production of thermometers of this type necessarily involves considerable skill in the production of the auxiliary reservoir having regard to its complex shape. Moreover in the use of the finished instrument skill and patience are required in the setting of the thermometer, in order that an adjustment should be made on the auxiliary scale without trapping too little or too much of excess liquid in the auxiliary reservoir.

Broadly in accordance with the present invention a Beckmann thermometer has the usual main column and has in prolongation thereof a simple rectilinear auxiliary reservoir connected to the upper end of the main column through the intermediary of a droplet splint which is made with an orifice of such dimensions that liquid can pass therethrough from the main column to the auxiliary reservoir when the thermometer is inverted, and can on righting the thermometer pass back from the auxiliary reservoir to the main column so long as the thread of liquid remains uninterrupted as between the auxiliary reservoir and the main column, any interruption causing emptying of the droplet splint itself, resulting in prevention of return of liquid in the auxiliary reservoir to the main column when such liquid tends to flow back to the main column under the action of its weight.

It will be clear that the orifice of the droplet splint will have to be adjusted in accordance with the head of liquid that is to be desirably prevented from return therethrough. When this adjustment is correctly made, the droplet splint functions after the manner of a non-positive return valve.

For a better understanding of the invention and to show how the same may be carried into effect, reference will now be made to the accompanying drawings in which, Figure 1 shows a side view of a known type of Beckmann thermometer.

Figure 2 shows to a larger scale part of the theromometer shown in Figure 1.

Figure 3 shows part of one embodiment of the thermometer of the invention.

Figure 4 shows an enlarged sectional detail of part of Figure 3.

Figures 5, 6:
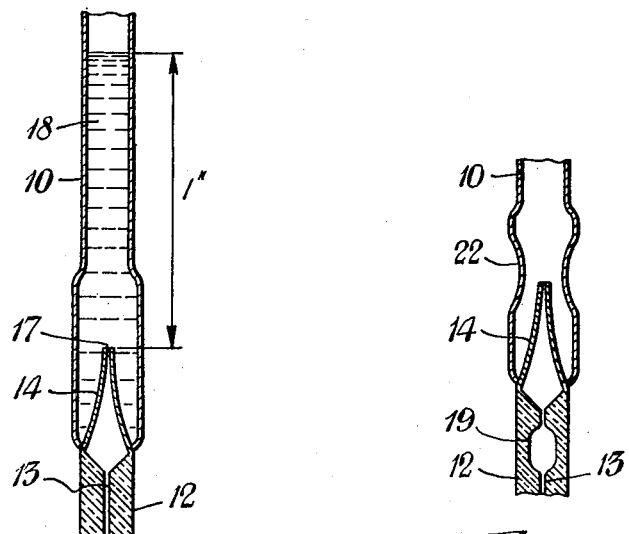
Figure 5 shows an enlarged sectional detail, somewhat similar to Figure 4.
Figure 6 shows an enlarged sectional detail of a second embodiment.

Referring to the drawings, Figure 1 shows a Beckmann thermometer of the known type having a main reservoir 1, leading to a main column 3 with a bore 2. The main column 3 terminates at its upper end in a droplet splint 4 which communicates with an auxiliary reservoir shown in more detail in Figure 2. The auxiliary reservoir consists essentially of a relatively large bore tube with two consecutive U-formations 5 and 6. The first leg 7 of one U-formation 5 extends upwardly from the main column 3, whilst the second leg 8 of the same U-formation 5 also forms a leg of the other U-formation 6. An auxiliary scale 9 is associated with the leg 7 of the U-formation 5. The droplet splint 4 extends into the tube forming the leg 7, which has a slightly increased diameter over that part surrounding the splint 4.

In the Beckmann thermometer of the invention the main reservoir (not shown) and the associated main column 12 with bore 13 are constructed in a similar manner to the corresponding parts of the known thermometer, but the two consecutive U-formations are replaced by an auxiliary reservoir consisting of a straight tube 10 of relatively large diameter which extends upwards from the main column 12 with bore 13. The bore 13 is surmounted by a droplet splint 14 which extends upwardly into the tube 10, there being a local increase in diameter in that part of the tube surrounding the splint. Additionally, immediately below the droplet splint 14 there is a small cavity 16 formed by an increase in the diameter of the bore 13. About halfway along the length of the tube 10, there is a narrowing 15 in the tube, which effectively divides the whole tube into two parts. An auxiliary scale 11 is made available behind the auxiliary reservoir 10 in between the droplet splint 14 and the narrowing 15.

In the employment of the new thermometer described above, when it is desired to set the thermometer it is inverted so that liquid will run from the main reservoir (not shown) through the bore 13 and hence through the droplet splint 14. The liquid will gradually fill the auxiliary reservoir 10 until no more liquid passes through the droplet splint 14 and there is a continuous thread of the liquid in the bore 13, and the auxiliary reservoir 10. By inverting the thermometer, liquid will be caused to flow from the auxiliary reservoir 10 and through the droplet splint 14. The level of liquid in the auxiliary reservoir is now brought down to the appropriate marking upon the auxiliary scale 11. At this point the thermometer is turned upon its side with the auxiliary reservoir 10 at a lower level than the main reservoir, and given a sharp tap so that the liquid in the auxiliary reservoir 10 separates from the droplet splint 14 and runs through the narrowing 15 in the auxiliary reservoir. Upon bringing the thermometer to its normal upright position, it will be realised that the liquid actually in the droplet splint will run down the bore 13 in the tube 12 a fraction of a second before the liquid in the auxiliary reservoir 10 once more contacts the orifice 17 of the droplet splint 14. If the orifice 17 is of a sufficiently small diameter, it is found that the liquid in the auxiliary reservoir 10 will not return to the bore 13 when the thread has been broken by the emptying of the droplet splint 14 itself. It is found in practice (see Figure 5) that the satisfactory behaviour of the droplet splint 14 will be obtained if the area of the cross-section of the orifice 17 is in the region of 0.0395 up to 0.0625 of a millimetre. A splint in the range will successfully hold a mercury column 18 of about 1″ in height so that the column will not pass back through the splint 14 once the latter has been emptied.

This height is measured upwards from the orifice 17 of the droplet splint 14. If it is anticipated that the height of the mercury column 18 in the auxiliary reservoir 10 may be greater, the orifice 17 must be made proportionally smaller in area.

Figure 7:
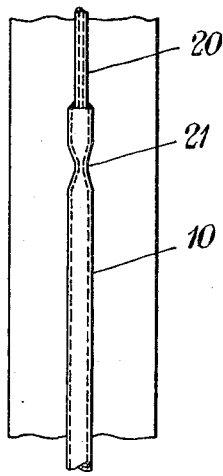
Figure 7 shows part of a third embodiment.

Various modifications may be made to the particular embodiment described hereinbefore. The local increase in diameter of the straight tube 10, where it surrounds the droplet splint 4, may have a central indentation 22 so that mercury cannot crash against the joint of the droplet splint (see Figure 6) and the main column 12. The auxiliary reservoir 10 (see Figure 7) may consist of the already mentioned tube of large diameter with a top section 20 of small bore. In this case, there may be an indentation 21 in the tube of large diameter just below its joint with the small bore tube 20, so that mercury cannot crash against the joint.

When the thermometer is to be used for freezing point determinations, there is an enlargement 19 of the bore 13 towards the upper end thereof (see Figure 6). When the thermometer has been set for very low temperatures, and is then removed to more normal temperatures, the mercury will expand. If the column rose beyond the droplet splint 14, it would necessitate a resetting each time the thermometer was employed. The enlargement 19 of the bore hence acts as a safety reservoir.

It will be appreciated that although the splint described above will serve to hold a column of liquid above it and prevent the return thereof it will be possible under certain circumstances to cause the liquid to pass back through the splint even when the latter was initially empty and the thread was broken. This could be caused by violent shakings or by simply forcing the liquid through the splint under the action of some external force such as induced centrifugal force. In general however the liquid will not pass through the splint merely under the action of its own weight where a column is only of such a height that it can be read upon the auxiliary scale.

I claim:

1. In a Beckmann thermometer having the usual main reservoir and main column with a bore centrally located therein and adapted to contain mercury as a thermometer liquid, the end of the bore of the main column remote from said reservoir ending in a droplet splint, a straight tubular extension secured to said main column and having a bore the axis of which is substantially coincident with the axis of the main bore, said extension communicating with the upper end of the main column through the intermediary of said droplet splint, the bore of said extension being divided into two portions by a restriction spaced from said splint with respect to the axis of the bores, said restriction being of such dimensions as to retard flow of thermometer liquid therethrough, the droplet splint being made with an orifice of such dimensions that liquid can pass therethrough from the main column to the auxiliary reservoir when the thermometer is inverted and can on righting the thermometer pass back from the auxiliary reservoir to the main column as long as the thread of liquid remains uninterrupted as between the auxiliary reservoir and the main column, any interruption allowing emptying of the droplet splint itself and said orifice being of such size as to prevent return of the remaining liquid in the auxiliary reservoir to the main column when such liquid tends to flow back to the main column under the action of its weight.

2. A Beckmann thermometer as claimed in claim 1, wherein the area of cross-section of the orifice is in the region of 0.0395 to 0.0625 square millimeters when the height of the mercury column in the auxiliary reservoir above the droplet splint may be about one inch and is proportionally decreased when the height of the mercury column in the auxiliary reservoir may be greater.

3. A Beckmann thermometer as claimed in claim 2, wherein a cavity is formed in the bore of the main column immediately below the droplet splint by making a local increase in diameter of the said bore.

4. A Beckmann thermometer as claimed in claim 2, wherein there is an enlargement of the main column bore towards the upper end thereof.

5. A Beckmann thermometer as claimed in claim 2, wherein the tube forming the auxiliary reservoir merges into an end section having a comparatively narrow bore.

6. A Beckmann thermometer as claimed in claim 5, wherein there is an indentation in the tube of the auxiliary reservoir just prior to its merging with the comparatively narrow bore tube.

7. A Beckmann thermometer as claimed in claim 2, wherein the bore of the reservoir surrounds the droplet splint and there is a local increase in internal diameter of the auxiliary reservoir over that portion of it surrounding the droplet splint.

8. A Beckmann thermometer as claimed in claim 7, wherein there is a substantially central indentation in that portion of the auxiliary reservoir having a local increase in diameter.

References Cited in the file of this patent

UNITED STATES PATENTS

| Number | Name | Date |
|---|---|---|
| 1,271,087 | Schneider | July 2, 1918 |

FOREIGN PATENTS

| Number | Country | Date |
|---|---|---|
| 485,995 | France | Dec. 4, 1917 |

OTHER REFERENCES

Central Scientific Co., Chicago, p. 497 Catalogue C #222, 1922, QD 53.C397.